US012655684B2

(12) United States Patent
Hung

(10) Patent No.: US 12,655,684 B2
(45) Date of Patent: Jun. 16, 2026

(54) WINDOW BLINDS MECHANISM

(71) Applicant: Shih-Min Hung, Dacun Township (TW)

(72) Inventor: Shih-Min Hung, Dacun Township (TW)

(*) Notice: Subject to any disclaimer, the term of this patent is extended or adjusted under 35 U.S.C. 154(b) by 318 days.

(21) Appl. No.: 18/380,702

(22) Filed: Oct. 17, 2023

(65) Prior Publication Data

US 2025/0122762 A1 Apr. 17, 2025

(51) Int. Cl.
*E06B 9/322* (2006.01)

(52) U.S. Cl.
CPC ...... *E06B 9/322* (2013.01); *E06B 2009/3225* (2013.01)

(58) Field of Classification Search
CPC .... E06B 9/32; E06B 9/322; E06B 2009/3222; E06B 2009/3225; E06B 9/38; E06B 9/40; E06B 9/42; E06B 9/60; E06B 9/56; E06B 9/68
See application file for complete search history.

(56) References Cited

U.S. PATENT DOCUMENTS

| | | | | |
|---|---|---|---|---|
| 6,588,481 | B1 * | 7/2003 | Hsu | E06B 9/32 160/173 R |
| 7,159,636 | B2 * | 1/2007 | Liang | E06B 9/30 160/170 |
| 10,273,748 | B2 * | 4/2019 | Chen | E06B 9/322 |
| 11,459,819 | B2 | 10/2022 | Liu | |
| 2006/0096719 | A1 * | 5/2006 | Wu | E06B 9/32 160/170 |
| 2007/0151675 | A1 * | 7/2007 | Nien | E06B 9/30 160/84.05 |
| 2007/0272364 | A1 * | 11/2007 | Liang | E06B 9/322 160/84.05 |
| 2007/0284060 | A1 * | 12/2007 | Liang | E06B 9/32 160/170 |
| 2008/0264576 | A1 * | 10/2008 | Cheng | E06B 9/32 160/168.1 V |
| 2008/0314531 | A1 * | 12/2008 | Cheng | E06B 9/322 160/192 |
| 2012/0118515 | A1 * | 5/2012 | Chen | E06B 9/326 160/170 |
| 2015/0028144 | A1 * | 1/2015 | Defenbaugh | E06B 9/322 242/378.4 |
| 2016/0290038 | A1 * | 10/2016 | Hung | E06B 9/322 |
| 2017/0107075 | A1 * | 4/2017 | Hung | E06B 9/322 |
| 2017/0321476 | A1 * | 11/2017 | Zhang | E06B 7/086 |
| 2017/0356241 | A1 * | 12/2017 | Lin | E06B 9/262 |
| 2018/0291679 | A1 * | 10/2018 | Zheng | E06B 9/322 |
| 2019/0063147 | A1 * | 2/2019 | Cheng | E06B 9/322 |

(Continued)

*Primary Examiner* — Johnnie A. Shablack
*Assistant Examiner* — Matthew R. Shepherd

(57) ABSTRACT

Window blinds include a blinds member, a rope reel, and at least two dampers. The rope reel has a bottom casing, a first rolling wheel, a second rolling wheel, a plurality of planetary gears, a top casing, a driving wheel, and an upper cover. The driving gear of the first rolling wheel is engaged with the driving wheel through the planetary gears. Because of the high reduction ratio of the planetary gears, the spring rate of the scroll spring can be reduced, which reduces the length and volume of the scroll spring. This not only helps to reduce the cost of the scroll spring, but also allows flexibility in choosing the number of scroll springs based on curtain material volume.

6 Claims, 18 Drawing Sheets

(56) References Cited

U.S. PATENT DOCUMENTS

| | | | | |
|---|---|---|---|---|
| 2019/0162016 | A1* | 5/2019 | Chen | E06B 9/322 |
| 2020/0095825 | A1* | 3/2020 | Chen | E06B 9/322 |
| 2021/0025227 | A1* | 1/2021 | Liu | E06B 9/322 |
| 2021/0348444 | A1* | 11/2021 | Chen | E06B 9/307 |
| 2022/0205316 | A1* | 6/2022 | Chen | E06B 9/322 |

* cited by examiner

A-A

B-B

A-A

B-B

WINDOW BLINDS MECHANISM

BACKGROUND OF INVENTION

Field of Invention

The present invention relates to a window blinds mechanism.

Description of Related Art

Curtains are usually used in indoor environments to temporarily block light from windows to avoid excessive sun exposure and ensure a certain degree of privacy. Generally speaking, the height of curtains is often controlled by a drawstring, but the drawstring may cause accidents such as entanglement or suffocation, In order to prevent the accidents, the curtains have gradually been improved to a stringless form, and a retracting mechanism is used to assist the pulling and releasing of the string that runs through the curtain. However, frequent use of the retracting mechanism need to retract the spring repeatedly, which ultimately leads to the instability of the retracting mechanism. Therefore, it depends on the size of the spring itself. For example, the different thickness and width can provide different elastic force, and by cooperating with the limiting device to provide long-term friction to resist the movement of the pull string to assist the spring to avoid fatigue due to excessive elastic force, thus reducing the elastic force requirement of the spring and reducing the spring volume and cost.

However, the above-mentioned conventional spring reel and string reel do not have a direct transmission relationship, therefore, the conventional reduction wheel cannot drive the spring reel. To achieve the increase in torque, the spring leaf cannot effectively reduce the length and volume of the spring leaf. As the price of the spring leaf is increasing, it is difficult to effectively reduce the structural cost. At the same time, it also causes the design trouble of the transmission mechanism being large and requiring assembly space.

Therefore, it is desirable to provide a window blinds mechanism to mitigate and/or obviate the aforementioned problems.

SUMMARY OF INVENTION

An objective of present invention is to provide a reversing wrench, which is capable of improving the above-mention problems.

In order to achieve the above mentioned objective, a window blinds mechanism has a blinds member, a rope reel and at least two dampers. The rope reel has a bottom casing, a first rolling wheel, a second rolling wheel, a plurality of planetary gears, a top casing, a driving wheel and an upper cover. The driving gear of the first rolling wheel is engaged with the driving wheel through the planetary gears, with the high reduction ratio of the planetary gears, the spring rate of the scroll spring can be reduced which reduces the length and volume of the scroll spring. It not only helps to reduce the cost of the scroll spring, but also allows the flexibility to choose the number of the scroll spring according to the curtain material volume.

Other objects, advantages, and novel features of invention will become more apparent from the following detailed description when taken in conjunction with the accompanying drawings.

Picture 4 is a partially enlarged exploded view of the damper of the preferred embodiment of the present invention.

Figure 5:
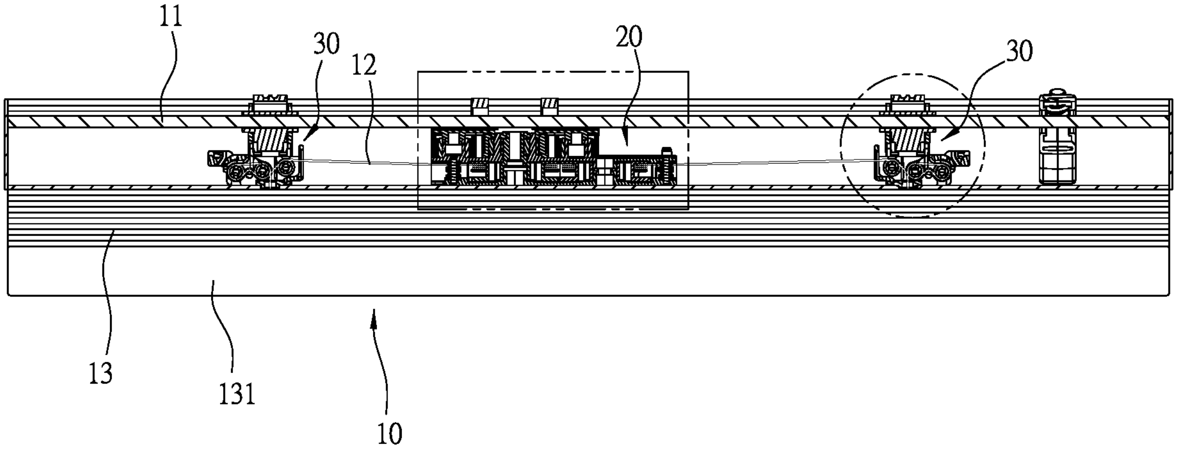

FIG. 5 is a combined cross-sectional view of the preferred embodiment of the present invention.

Figure 6:
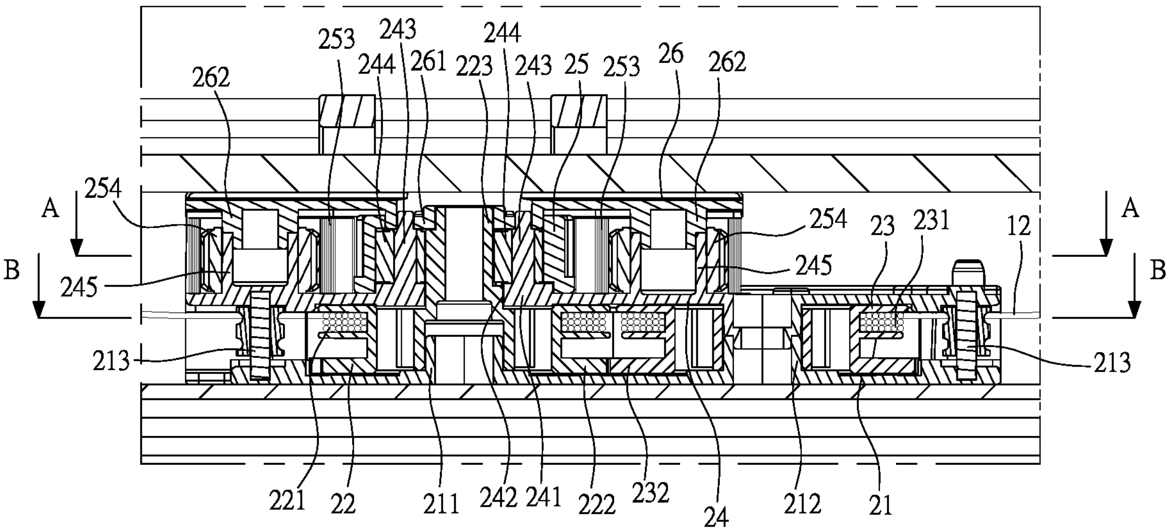

FIG. 6 is a partially enlarged cross-sectional view of the rope corresponding to the marked rectangular area in FIG. 5 of the preferred embodiment of the present invention.

Figure 7:
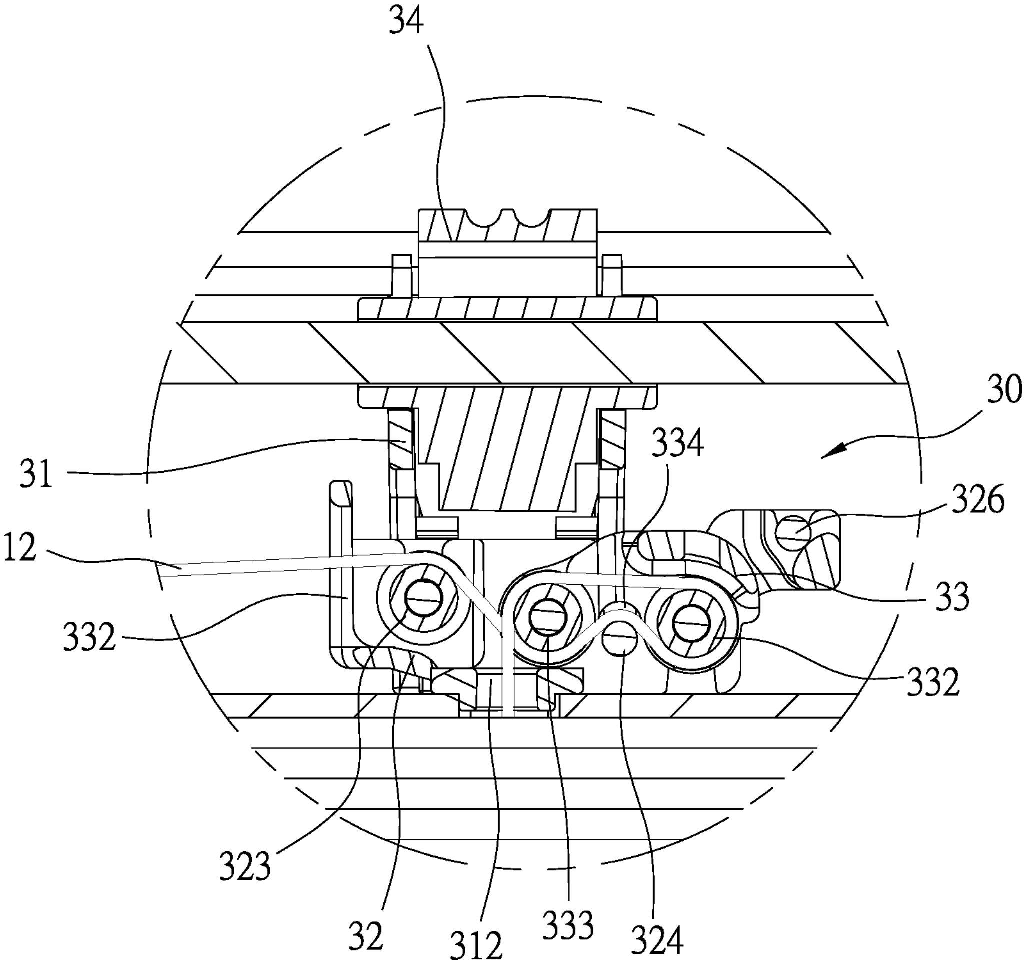

FIG. 7 is a partially enlarged cross-sectional view of the marked circle area in FIG. 5 corresponding to the preferred embodiment of the present invention.

Figure 8:
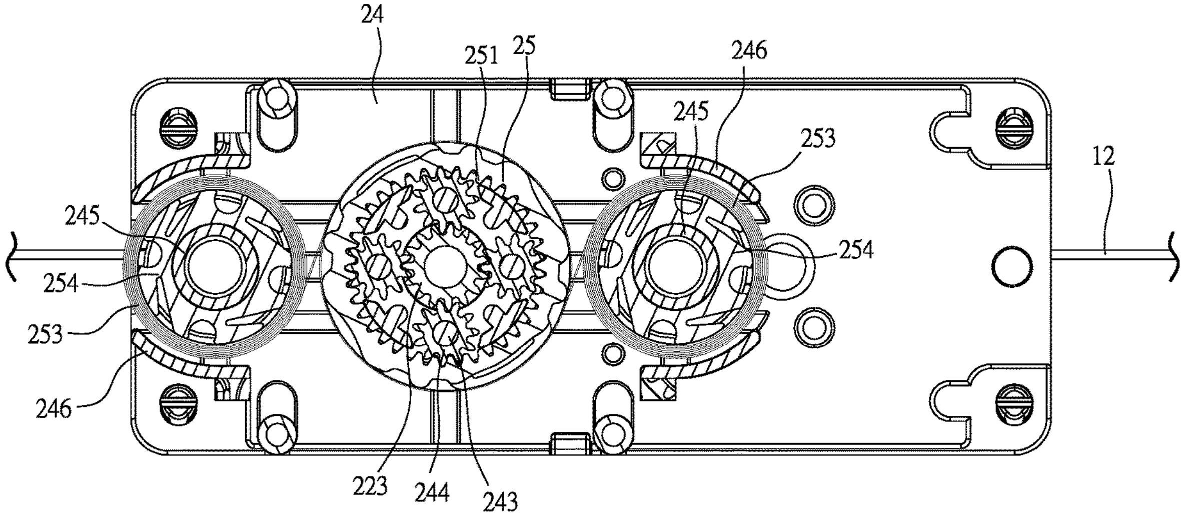

FIG. 8 is a cross-sectional view of the preferred embodiment of the present invention corresponding to the A-A section line in FIG. 6.

Figure 9:
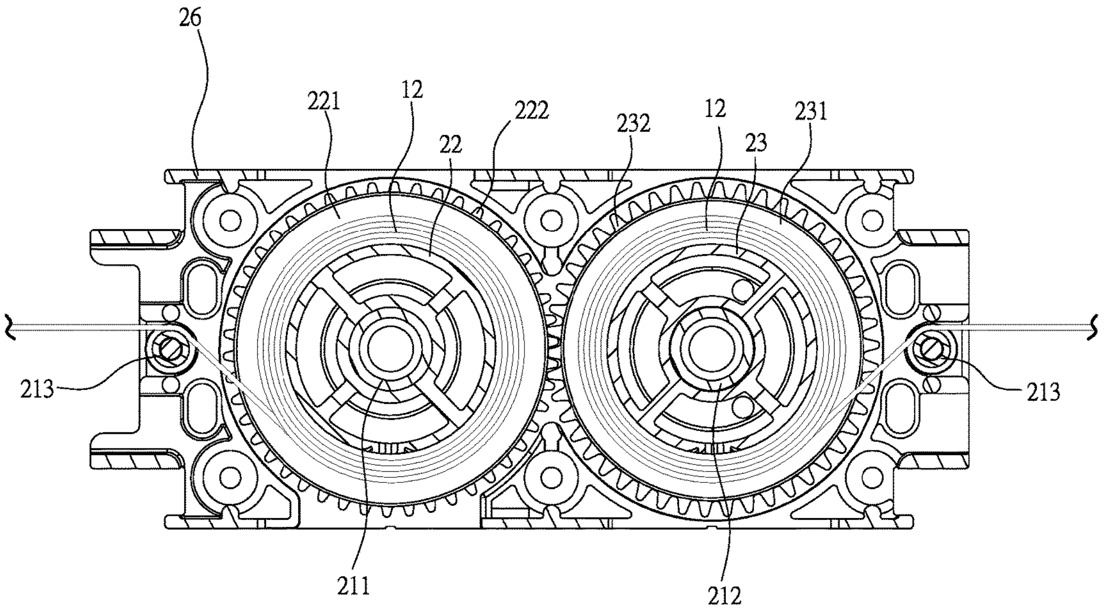

FIG. 9 is a cross-sectional view of the preferred embodiment of the present invention corresponding to the B-B section line in FIG. 6.

Figure 10:
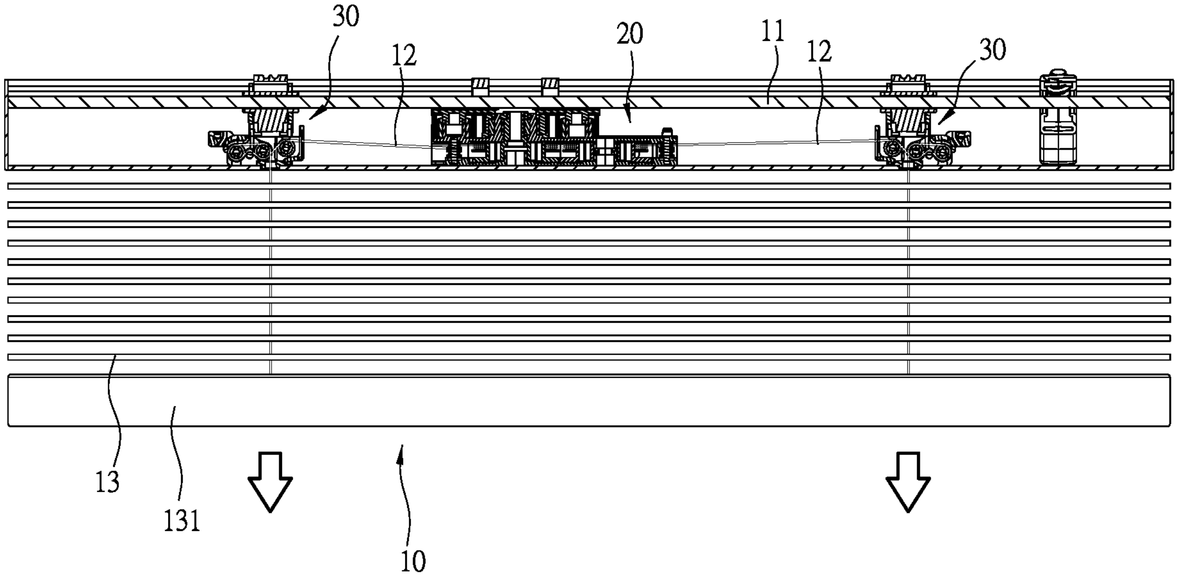

FIG. 10 is a schematic drawing of the blinds drop-down expansion according to the preferred embodiment of the present invention.

Figure 11:
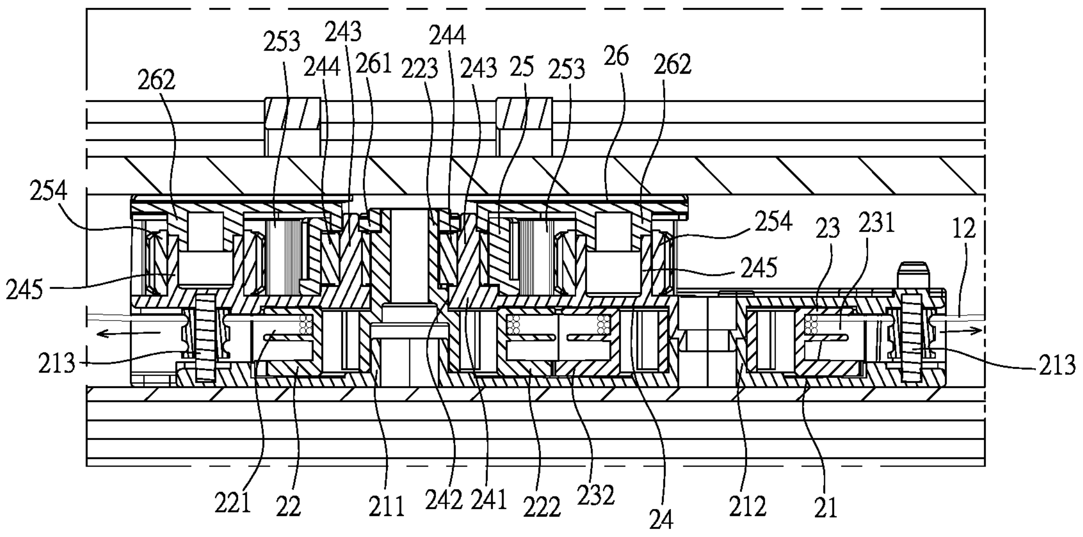

FIG. 11 is a cross-sectional view of the rope being pulled out from the rope reel.

Figure 12:
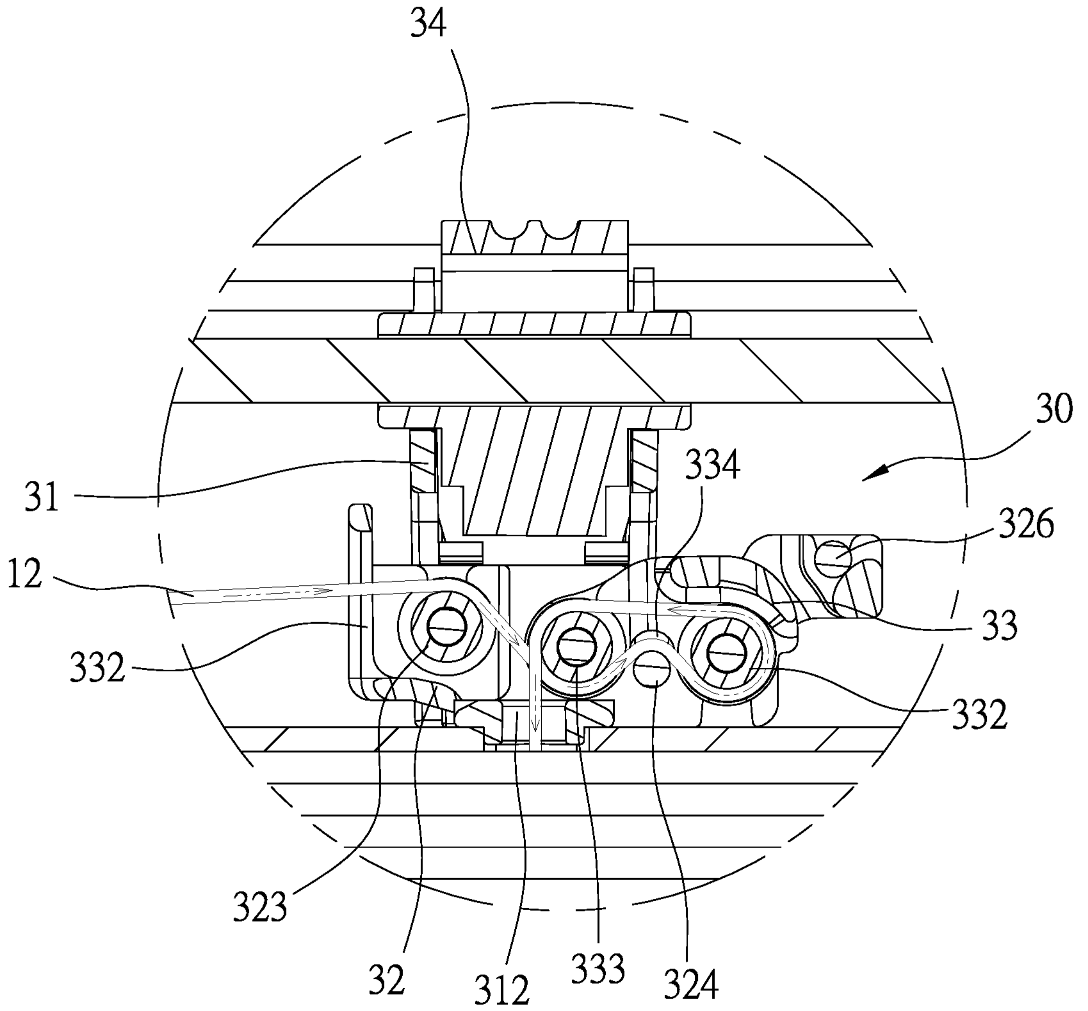

FIG. 12 is a schematic drawing of the rope being pulled out of the exit hole of the damper.

Figure 13:
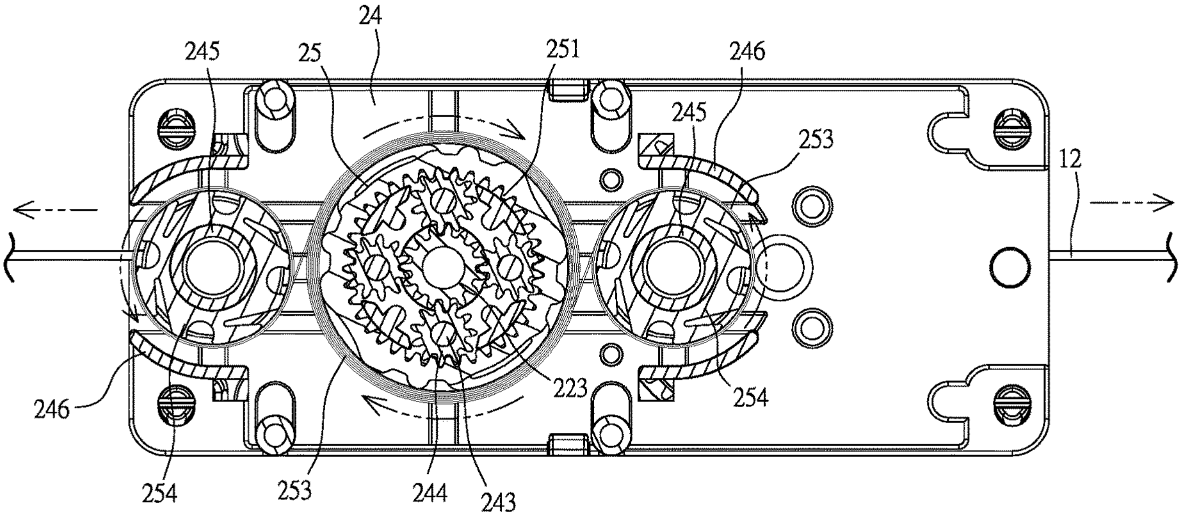

FIG. 13 is a schematic drawing showing when the rope being pulled out the driving wheel rolls up the two scroll springs.

Figure 14:
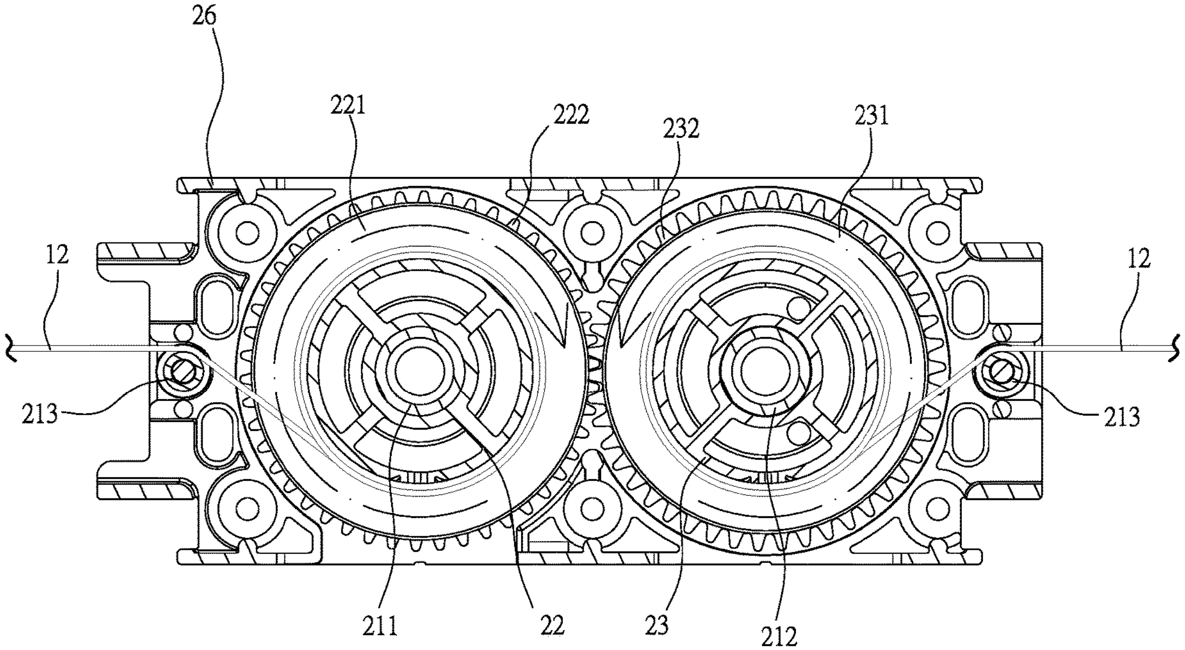

FIG. 14 is a schematic drawing showing the first and the second rolling wheels engaging with each other as the rope is pulled out.

Figure 15:
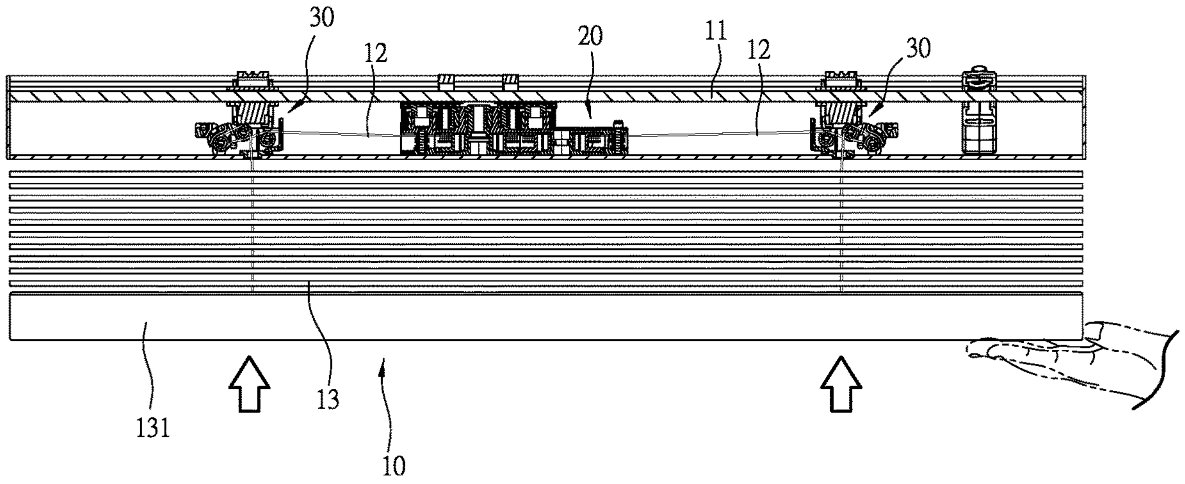

FIG. 15 is a schematic diagram showing the blinds being pushed up and closed according to the preferred embodiment of the present invention.

Figure 16:
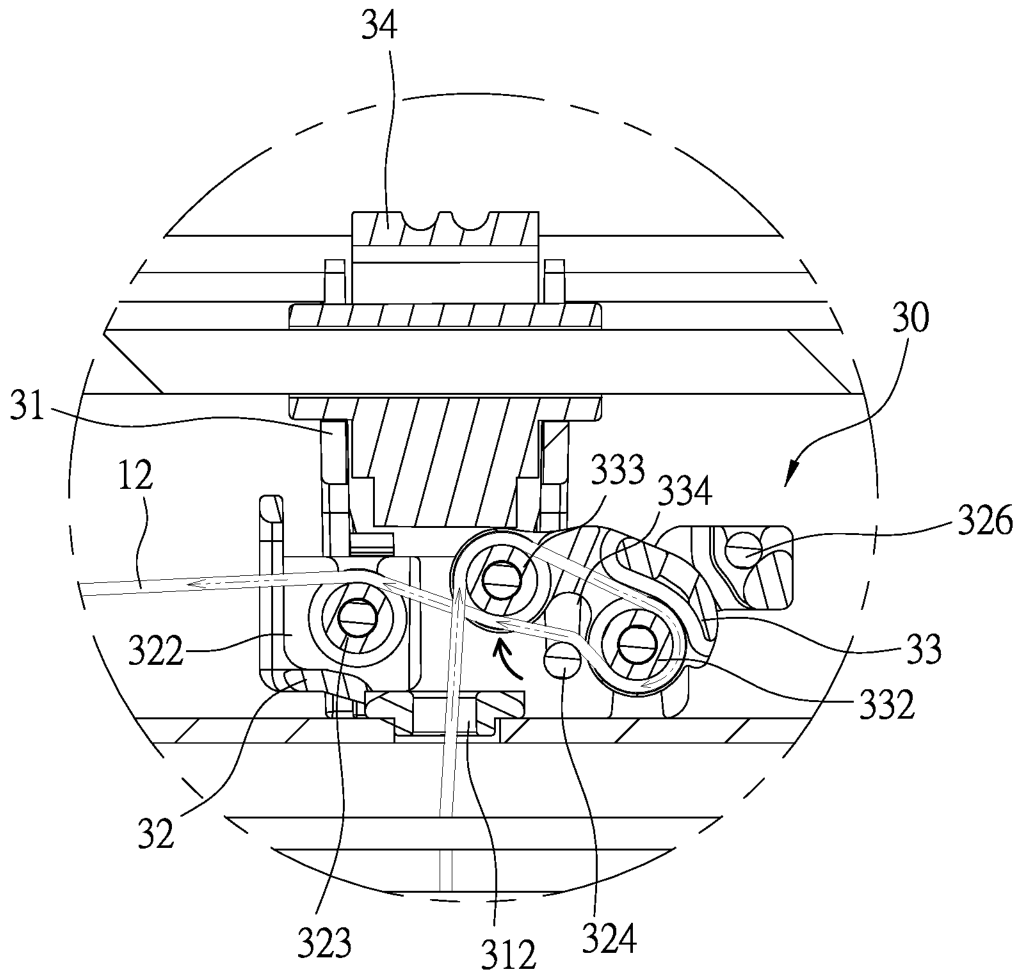

FIG. 16 is a schematic diagram showing the rope being pulled back from the entering hole of the damper.

Figure 17:
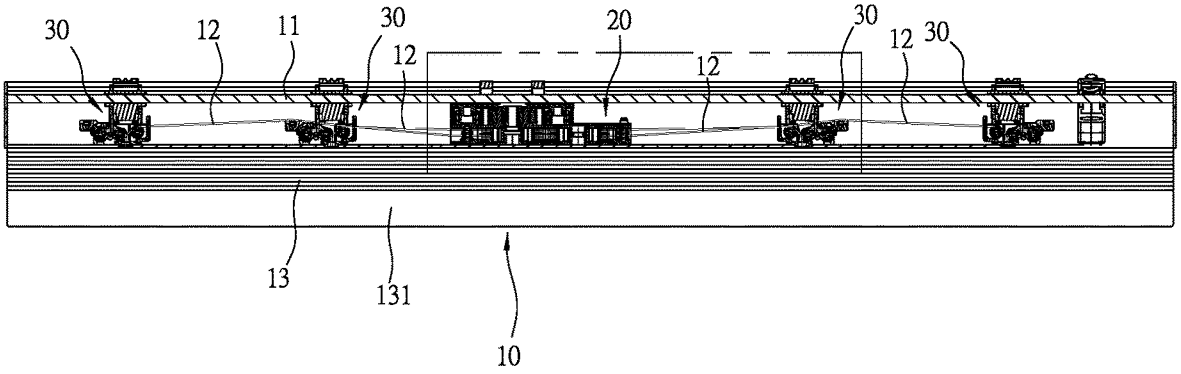

FIG. 17 is a schematic diagram of another embodiment of the present invention.

Figure 18:
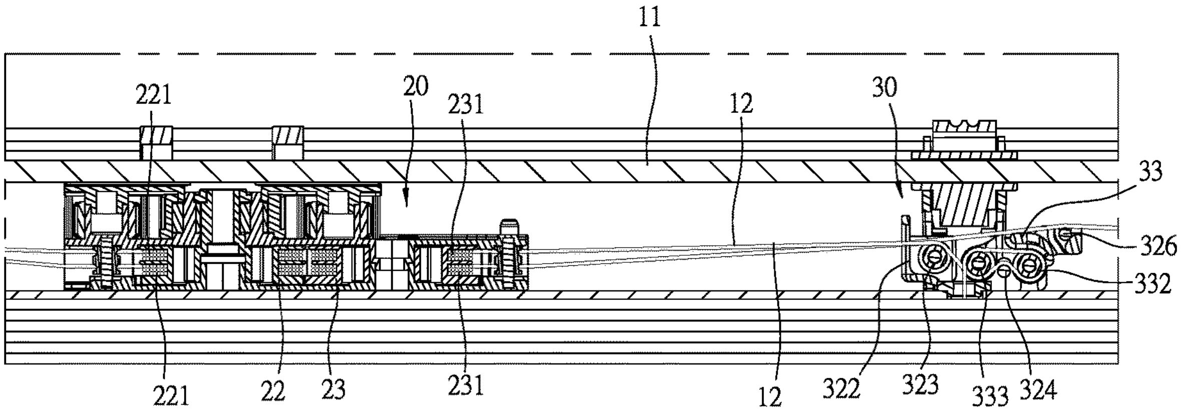

FIG. 18 is a partially enlarged schematic diagram of another embodiment of the present invention.

DETAILED DESCRIPTION OF PREFERRED EMBODIMENT

First, please refer to FIGS. 1 to 9. A window blinds mechanism a blinds member 10, a rope reel 20 and at least two dampers 30. The blinds member 10 has an upper track 11 and a plurality of blinds 13 connected by at least two ropes 12 and the upper track 11. The blinds 13 has a counterweight rail 131 at a bottom end. The rope reel 20 comprises a bottom casing 21, a first rolling wheel 22, a second rolling wheel 23, a top casing 24, a driving wheel 25 and an upper cover 26. The bottom casing 21 has a first mandrel 211, a second mandrel 212 respectively for positioning the first and the second rolling wheel 22, 23. Both ends of the bottom casing 21 have an opening and at least one guiding pulley 213. The first and the second rolling wheels 22, 23 respectively have at least one holding spaces 221, 231 for securing one end of the two rope 12, and the first and the second rolling wheel 22, 23 also respectively have a chainrings 222, 232 engaging with each other. The first rolling wheel 22 further has a driving gear 223 at an axial top end. The top casing 24 and the bottom casing 21 are assembled together to limit the first and the second rolling wheels 22, 23 between the bottom casing 21 and the top casing 24. The top casing 24 has a planetary gear holder 241, the planetary gear holder 241 has a through hole 242 for accepting the driving gear 223, and the planetary gear holder 241 has a plurality of axial rods 243 around the through hole 242 for respectively inserting into a plurality of planetary gears 244 engaging with the driving gear 233. The top casing 24 further has at least two fixed shaft 245 at two opposite sides of the planetary gear holder 241. The top casing 24 further has two curved guards 246 adjacent to each fixed shaft 245. The driving wheel 25 has a sleeve hole 252 with inner ring teeth jacketing onto the planetary gear holder 241 and engaging with the planetary gear 244, and two sides of the driving wheel 25 are respectively wrapped by at least two scroll springs 253. The two scroll spring 253 are assembled onto the two fixed shafts 245 via a rotator 254, and the curved guard 246 covers the two scroll spring 253 and fastened to the top casing 24. The upper cover 26 has a protruding base 261 at a bottom, and the protruding base 261 has at least two snap-on convex shafts 262 at opposite sides, a limiting through hole 263 at a center, and a plurality of through holes 264 around the limiting through hole 263. The protruding base 261 faces the sleeve hole 252 of the driving wheel 25, the limiting through hole 263 jackets and limits a top end of the driving gear 223, each of the through holes 264 is passed through each of the axial rods 243, and the two snap-on convex shafts 262 are respectively inserted into the two rotators 254. The upper cover 26 covers the driving wheel 25 and the two scroll springs 253 and fastens with the top casing 24. The damper 30 has a first main body 31, a second main body 32 and a limiting member 33. The first main body 31 has an assembly space 311 and an exit hole 312 connected to the assembly space 311 at a bottom thereof, and the assembly space 311 further has a plurality of pairs of fastening portions 313 and two limiting recesses 314 at a bottom. The second main body 32 has a hollow portion 321 and an entering hole 322 connected to the hollow portion 321, the hollow portion 321 has a first guide wheel 323 adjacent to the entering hole 322 and a first guide rod 324 disposed lower than the first guide wheel 323 and adjacent to another end of the second main body 32. Both sides of the second main body 32 respectively have a limiting protrusion 325 disposed at a lower end, the limiting member 33 passes through the hollow portion 321 of the second main body 32 and is rotatably positioned by a pivot axis 331, and one end of the limiting member 33 engages with a second guide wheel 332 via the pivot axis 331 and another end is installed with a third guide wheel 333. The limiting member 33 further has an engaging slot 334 between the second and the third guide wheel 332, 333, so the limiting member 33 is able to swing in the hollow portion 321 via the pivot axis 331, and make the engaging slot 334 being above the first guide rod 324. The second main body 32 is assembled in the assembly space 311 of the first main body 31 with the limiting member 33, the end with the entering hole 322 of the second main body protruding from a side of the first main body, and a lower end of the second main body connected to the exit hole. The two limiting protrusions 325 of the second main body 32 respectively engage with the two limiting recess 314 to limit a position of the second main body 32 in the assembly space 311, and the fastening portions 313 secure the second main body 32. The end with the entering hole 322 of the second main body 32 protruding from a side of the first main body 31, and a lower end of the second main body 32 connected to the exit hole 312. Furthermore, another ends of the two ropes 12 are respectively pulled from the two guiding pulleys 213 at each side of the bottom casing 21 and enter into the hollow portion 321 respectively from the entering hole 322 of the two damper 30, then passes above the first guide wheel 323, passes under the third guide wheel 333, passes above the first guide rod 324, passes under the second guide wheel 323, passes above the second and the third guide wheels 332, 333, and then passes down through the exit hole 312. Finally, the two dampers 30 are installed in the upper track 11 and along two sides of the rope reel 20, and another ends of the two ropes 12 is connected to the plurality of blinds 13 and the counterweight rail 131. Finally, the two damper 30 are installed in the upper track 11 and on both sides of the rope reel 20, and the other ends of the rope 12 pass down through the blinds 13 and then are connected to the counterweight rail 131.

The first main body 31 of the damper 30 has a blinds controller 34 connected to the blinds 13 for adjusting angles of the blinds 13 via rotation.

Figure 1:
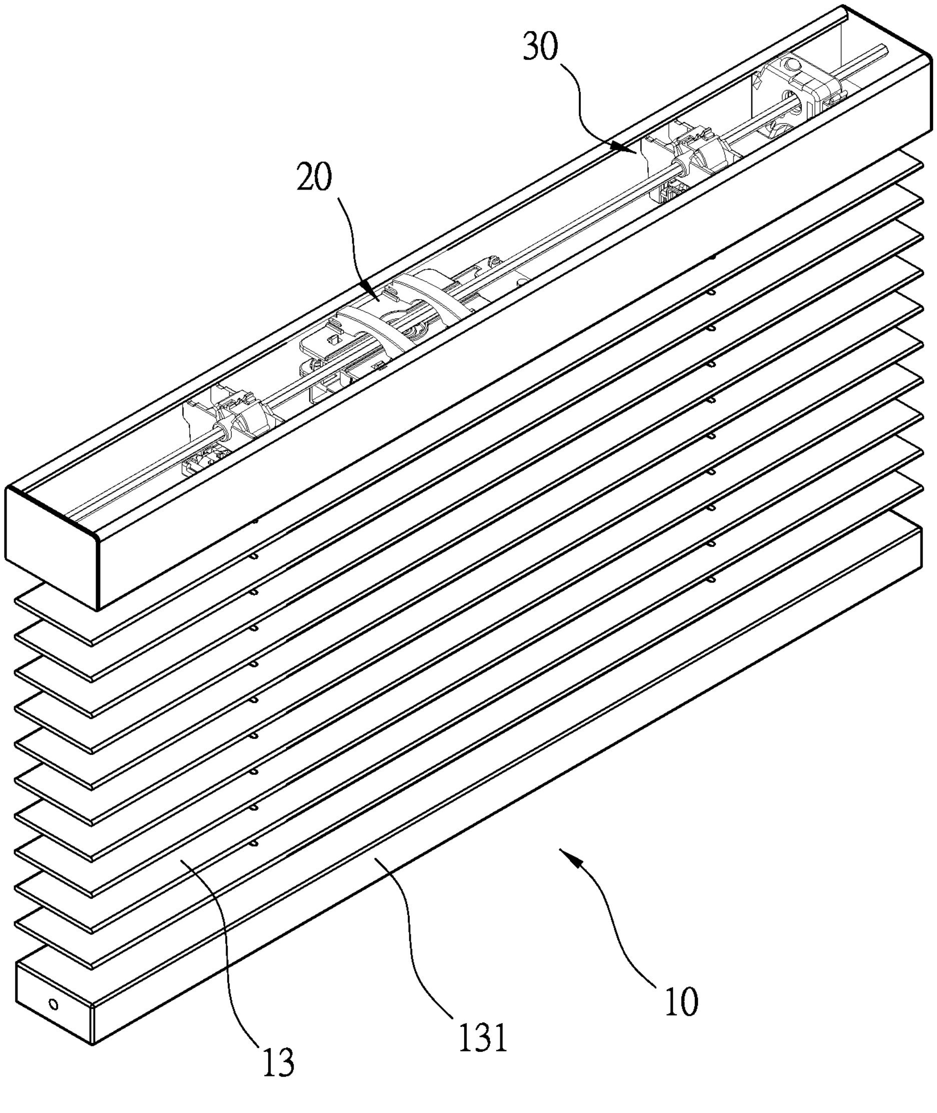
FIG. 1 is a three-dimensional view of a preferred embodiment of the present invention.
Figure 2:
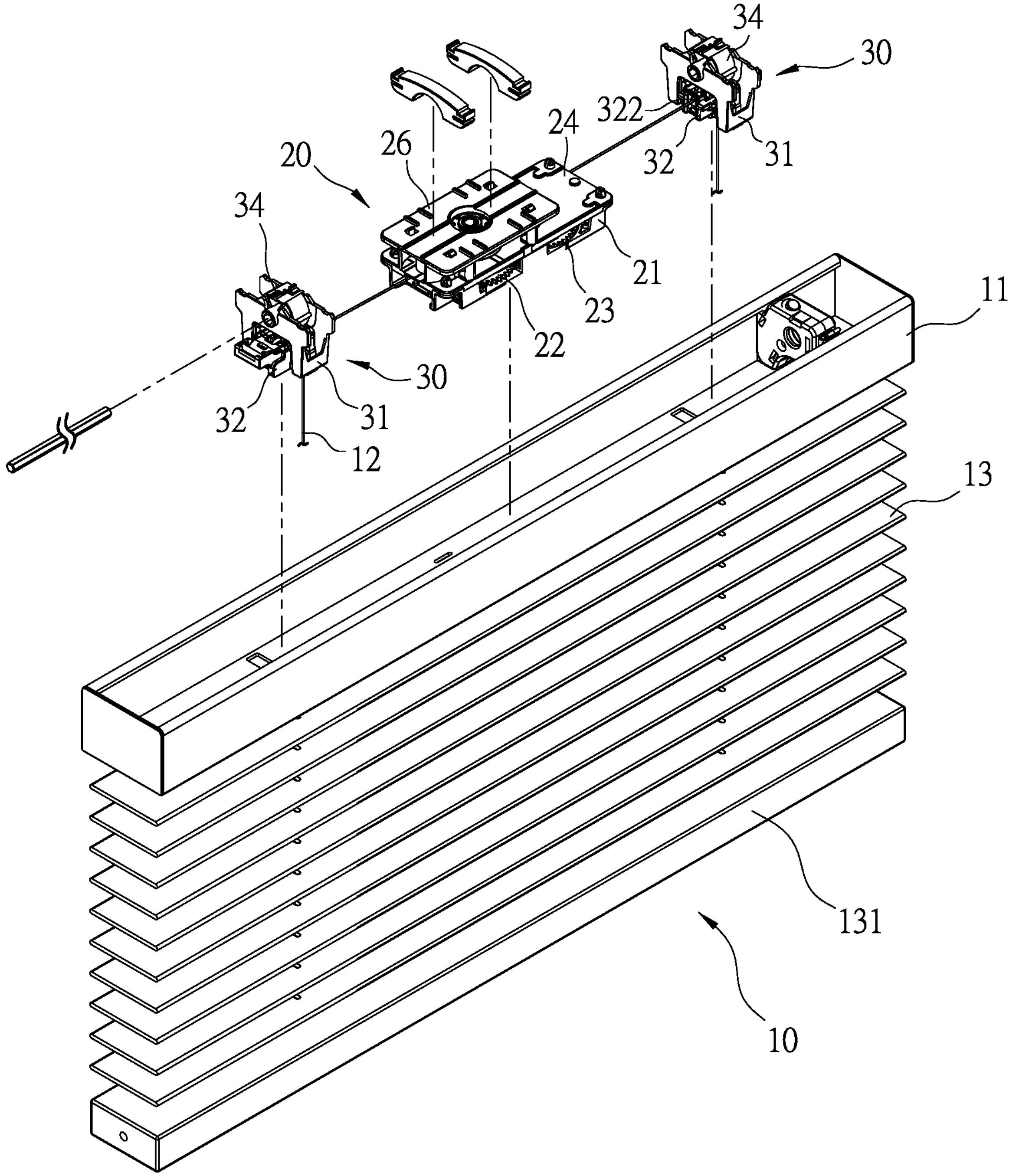
FIG. 2 is an exploded view of the preferred embodiment of the present invention.
Figure 3:
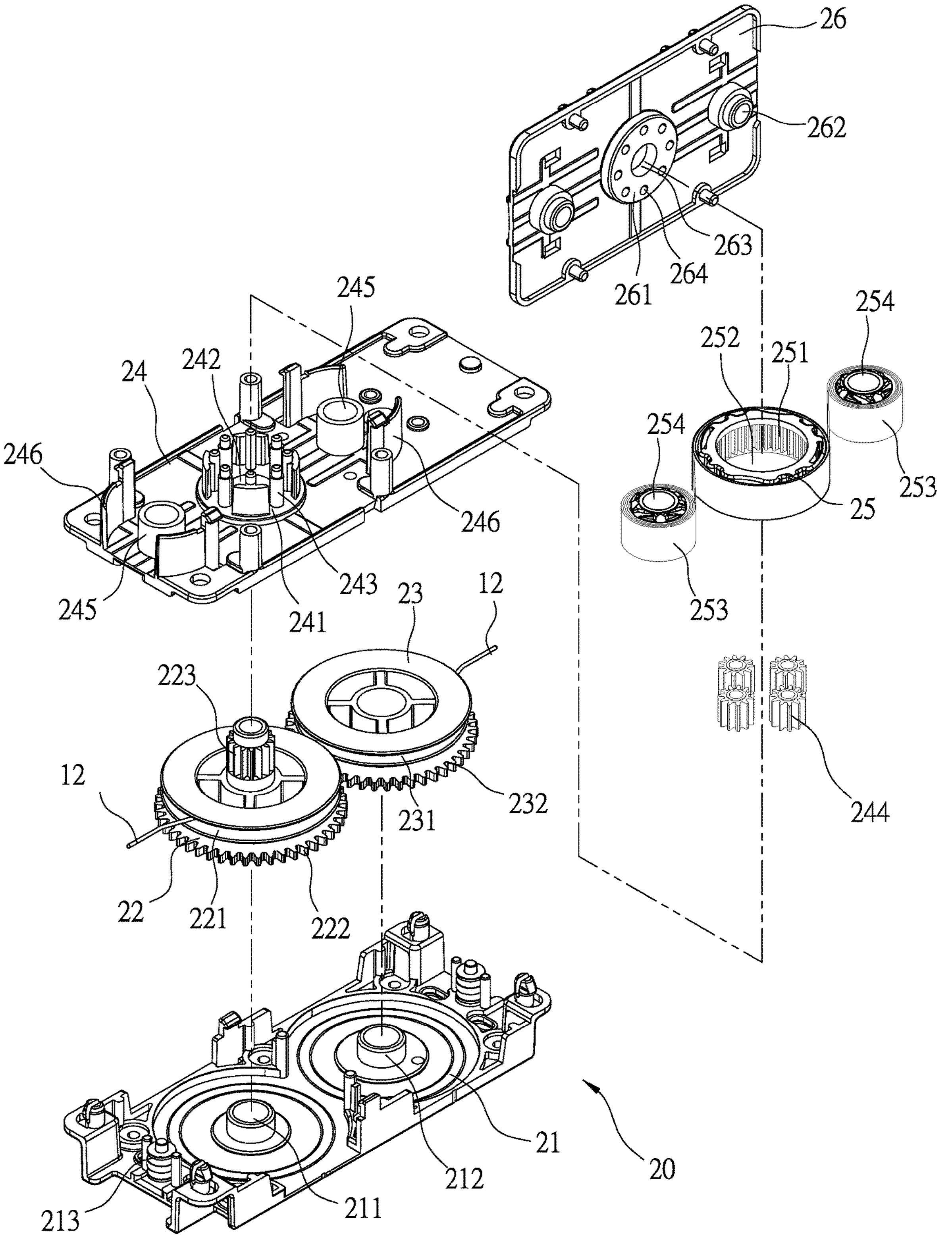
FIG. 3 is a partially enlarged exploded view of the rope reel of the preferred embodiment of the present invention.
Figure 4:
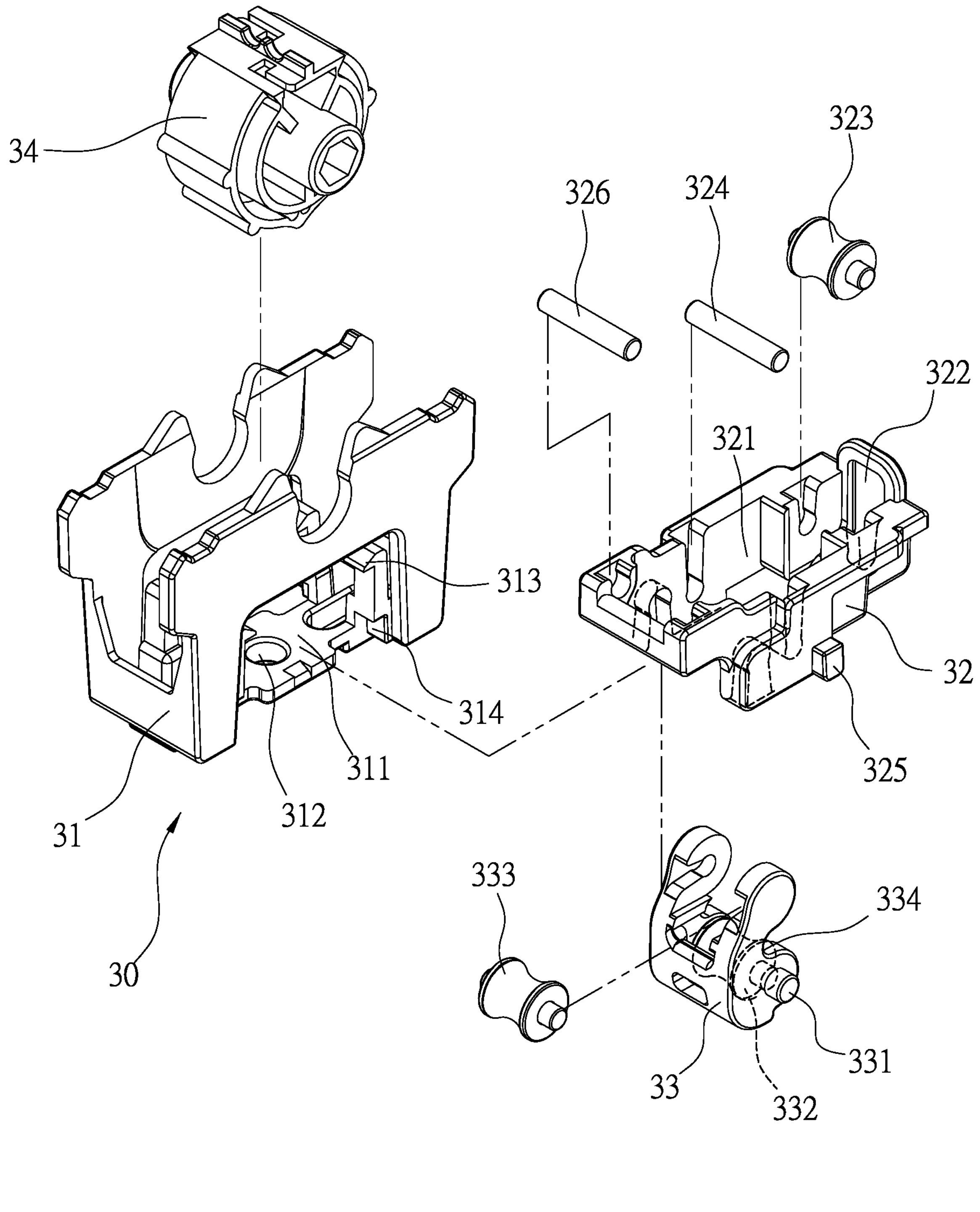

The structure is in use, as shown in FIGS. 2 and 7. When the blinds member 10 is not in action, the ropes 12 finally pass the third guide wheel 333 and then stretch downward to connect to the counterweight rail 131 of the blinds 13, such that the ropes 12 have a pulling force due to the vertical weight of the counterweight rail 131 and pull down the third guide wheel 333 of the limiting member 33 to swing. Afterward, the engaging slot 334 of the limiting member 33 moves downward to the first guide rod 324, and then presses the ropes 12 down onto the first guide rod 324 and winds them into an S shape between the second and the third guide wheels 332, 333, thereby increasing the friction between the ropes 12 and the limiting member 33, and the two scroll springs 253 and the counterweight rail 131 balance each other to achieve the positioning effect of the blinds 13.

When the blinds 13 of the blinds member 10 are pulled down through the counterweight rail 131, as shown in FIGS. 10 to 14, since the user applies force on the counterweight rail 131 and pulls down, sum of the pull-down force and the weight of the counterweight rail 131 is greater than the elastic tension of the two scroll springs 253, so that the rope 12 can be pulled out from the first and the second rolling wheels 22, 23 to pull down and unfold the blinds 13. When the blinds 13 is pulled down and unfolded, the engaging slot 334 of the limiting member 33 also presses the ropes 12 downward against the first guide rod 324, so that the blinds 13 also have a frictional resistance when unfolded to prevent the rope 12 from being easily pulled and slow down the unfold speed of the blinds 13. When the blinds 13 reach the required position and the ropes 12 are released, the friction between the limiting member 33 and the rope 12 occurs, the resistance acts as a brake to prevent it from being retracted, and then the two scroll springs 253 and the counterweight rail 131 balance each other to achieve the positioning effect of the blinds 13.

In addition, when the blinds 13 are pulled down and unfolded, the two ropes 12 are pulled out from the holding space 221, 231 of the first and the second rolling wheels 22, 23, and drive the first and the second rolling wheels 22, 23 together. Meanwhile, the first rolling wheel 22 synchronously drives the planetary gears 244 to rotate through the driving gear 223 at the top, and also drives the driving wheel 25 to rotate and retract the two scroll springs 253. Accordingly, the planetary gears 244 increase the rotational torque of the driving wheel 25, so that the driving wheel 25 is rolled up more effortlessly and smoothly, which easily reaches the tensioned and stretched state of the two scroll springs 253.

When the blinds 13 of the blinds member 10 is pushed up and closed through the counterweight rail 131, please see FIGS. 15 and 16 with FIGS. 8 and 9, the user presses upward the counterweight rail 131 to reduce the vertical weight and release the two rope 12. Meanwhile, the elastic tension of the two scroll springs 253 is greater than the weight of the counterweight rail 131, so that the springs rebound and retract and drive the driving wheel 25 to reverse rotation, and the planetary gears 244 drive the first rolling wheel 22 to rotate, and the first and the second rolling wheels 22, 23 synchronously wind up the two roped 12. When the two ropes 12 are rolled up by the first and the second rolling wheels 22, 23 is being rolled up, since the first guide wheel 323 is higher than the first guide rod 324, the tension generated when the two ropes 12 being rolled up lifts up the third guide wheel 333 of the limiting member 33, so that the limiting member 33 swings upward and moves the engaging slot 334 away from the first guide rod 324, thereby reducing the frictional resistance of the ropes 12 and improving the smoothness of the winding process. Furthermore, with the high reduction ratio of the planetary gears 244, the rotation speed of the first and the second rolling wheels 22, 23 are improved, which allows the user to easily control the rising and closing of the blinds 13 by gently pushing the counterweight rail 131. When the counterweight rail 131 is released, the vertical weight of the counterweight rail 131 pulls down the third guide wheel 333 of the limiting member 33 through the ropes 12, as shown in FIG. 7, so that the ropes 12 are pressed down by the engaging slot 334 again and is pressed against on the first guide rod 324 and is wound in an S shape between the second and the third guide wheel 332, 333, thereby increasing the friction resistance between the ropes 12 and the limiting member 33, and starting braking and preventing the ropes 12 from being rolled back up, and then the interaction between the two scroll springs 253 and the counterweight rail 131 provides the positioning effect of the blinds 13.

Another embodiment of the present invention, as shown in FIGS. 17 and 18, the blinds member 10 can increase the number of the damper 30 according to the size and length of the blinds 13 to ensure that the blinds 13 can be unfolded and folded correctly. The first and the second rolling wheel 22, 23 of the rope reel 20 both respectively have two holding spaces 221, 231 at a top layer and a lower layers for securing one end of the ropes 12. Therefore, four ropes 12 can be paired with four dampers 30. The second main body 32 of each damper 30 has a second guide rod 326 opposite the entering hole 322, the second guide rod 326 is disposed higher than the first guide wheel 323, and two of the ropes 12 pass through the entering holes 322 of two of the dampers 30 and are lifted by the second guide rod 326 to avoid the first guide wheel 323 to combine four ropes 12 together to connect to the blinds 13.

With the structure of the above specific embodiment, the following benefits can be obtained: (1). The rope reel 20 is engaged with the driving wheel 25 through the planetary gears 244, with the high reduction ratio of the planetary gears 244, the spring rate of the scroll spring 253 can be reduced which reduces the length and volume of the scroll spring 253. It not only helps to reduce the cost of the scroll spring 253, but also allows the flexibility to choose the number of the scroll spring according to the curtain material volume. (2). The damper 30 can increase the frictional resistance of the rope 12 and start braking to prevent the rope 12 from being rolled back, and reduce the elastic restricting force of the two scroll springs 253, so as to ensure that the two scroll springs 253 operate the rolling operation and the pull-down unfolding operation of the blinds 13 correctly, and prolong elastic strength of two scroll springs 253.

Although the present invention has been explained in relation to its preferred embodiment, it is to be understood that many other possible modifications and variations can be made without departing from the spirit and scope of invention as hereinafter claimed.

What is claimed is:

1. A window blinds mechanism comprising:

a blinds member having an upper track and a plurality of blinds connected by at least two ropes and the upper track;

a rope reel installed in the upper track of the blinds member and comprising a bottom casing, a first rolling wheel, a second rolling wheel, a top casing, a driving wheel, and an upper cover;

wherein the bottom casing has a first spindle and a second spindle respectively for positioning the first and the second rolling wheel; the first and the second rolling wheel respectively having at least one holding space for securing one end of the at least two ropes, and the first and the second rolling wheels also respectively having a chainring engaging with each other; the first rolling wheel further having a driving gear at an axial top end thereof; the top casing and the bottom casing assembled together to limit the first and the second rolling wheels between the bottom casing and the top casing; the top casing has a planetary gear holder, and at least two fixed shafts are at two opposite sides of the planetary gear holder, the planetary gear holder having a through hole for accepting the driving gear, and the planetary gear holder has a plurality of planetary gears engaging with the driving gear around the through hole;

the driving wheel has a sleeve hole with inner ring teeth jacketing onto the planetary gear holder and engaging with the planetary gears, two sides of the driving wheel respectively wrapped by at least two scroll springs, and the at least two scroll springs are each assembled onto the two fixed shafts via a rotator, the upper cover covering the driving wheel and the at least two scroll springs and fastened to the top casing;

at least two dampers each having a first main body, a second main body and a limiting member; the first main body has an assembly space and an exit hole connected to the assembly space at a bottom thereof; the second main body has a hollow portion and an entering hole connected to the hollow portion, the hollow portion having a first guide wheel adjacent to the entering hole and a first guide rod disposed lower than the first guide wheel and adjacent to another end of the second main body; the limiting member passes through the hollow portion of the second main body and is rotatably positioned by a pivot axis, and one end of the limiting member engages with a second guide wheel via the pivot axis and another end is installed with a third guide wheel; the limiting member further has an engaging slot between the second and the third guide wheels and above the first guide rod, the limiting member capable of swinging in the hollow portion using the pivot axis; the second main body is assembled in the assembly space of the first main body with the limiting member, the end with the entering hole of the second main body protruding from a side of the first main body, and a lower end of the second main body connected to the exit hole;

another end of the at least two ropes passes through the respective entering hole, passes above the first guide wheel, passes under the third guide wheel, passes above the first guide rod, passes under the second guide wheel, passes above the second and the third guide wheels, and then passes down through the respective exit hole; the at least two dampers are installed in the upper track and along two sides of the rope reel, and another end of the at least two ropes is connected to the plurality of blinds.

2. The window blinds mechanism as claimed in claim 1, wherein a first end and a second end of the bottom casing have an opening and at least one guiding pulley, the top casing further has two curved guards adjacent to each fixed shaft, and the curved guards are configured to protect each scroll spring.

3. The window blinds mechanism as claimed in claim 1, wherein the first main body of the damper has a blinds controller connected to the blinds for adjusting angles of the blinds via rotation.

4. The window blinds mechanism as claimed in claim 1, wherein the assembly space of the first main body further has a plurality of pairs of fastening portions and two limiting recesses at a bottom, both sides of the second main body respectively having a limiting protrusion disposed at a lower end, the two limiting protrusions engaging with the two limiting recesses to limit a position of the second main body in the assembly space, and the fastening portions secure the second main body.

5. The window blinds mechanism as claimed in claim 1, wherein the first and the second rolling wheels of the rope reel respectively have two holding spaces at a top and a bottom for securing one end of the at least the two ropes, such that four ropes employ four dampers; the second main body of each damper has a second guide rod opposite the entering hole; the second guide rod is disposed higher than the first guide wheel, and two of the ropes pass through the entering holes of two of the dampers and are lifted by the second guide rod to avoid the first guide wheel to combine four ropes together to connect to the blinds.

6. The window blinds mechanism as claimed in claim 1, wherein the planetary gear holder has a plurality of axial rods around the through hole for respectively inserting into the planetary gears, the upper cover has a protruding base at a bottom, the protruding base has at least two snap-on convex shafts at opposite sides, a limiting through hole at a center, and a plurality of through holes around the limiting through hole; the protruding base faces the sleeve hole of the driving wheel, the limiting through hole jackets and limits a top end of the driving gear, each of the through holes is passed through each of the axial rods, and the two snap-on convex shafts are respectively inserted into the rotators.

* * * * *